Feb. 12, 1963 J. C. SINGLETON 3,077,335
STUD TENSIONER
Filed April 14, 1961
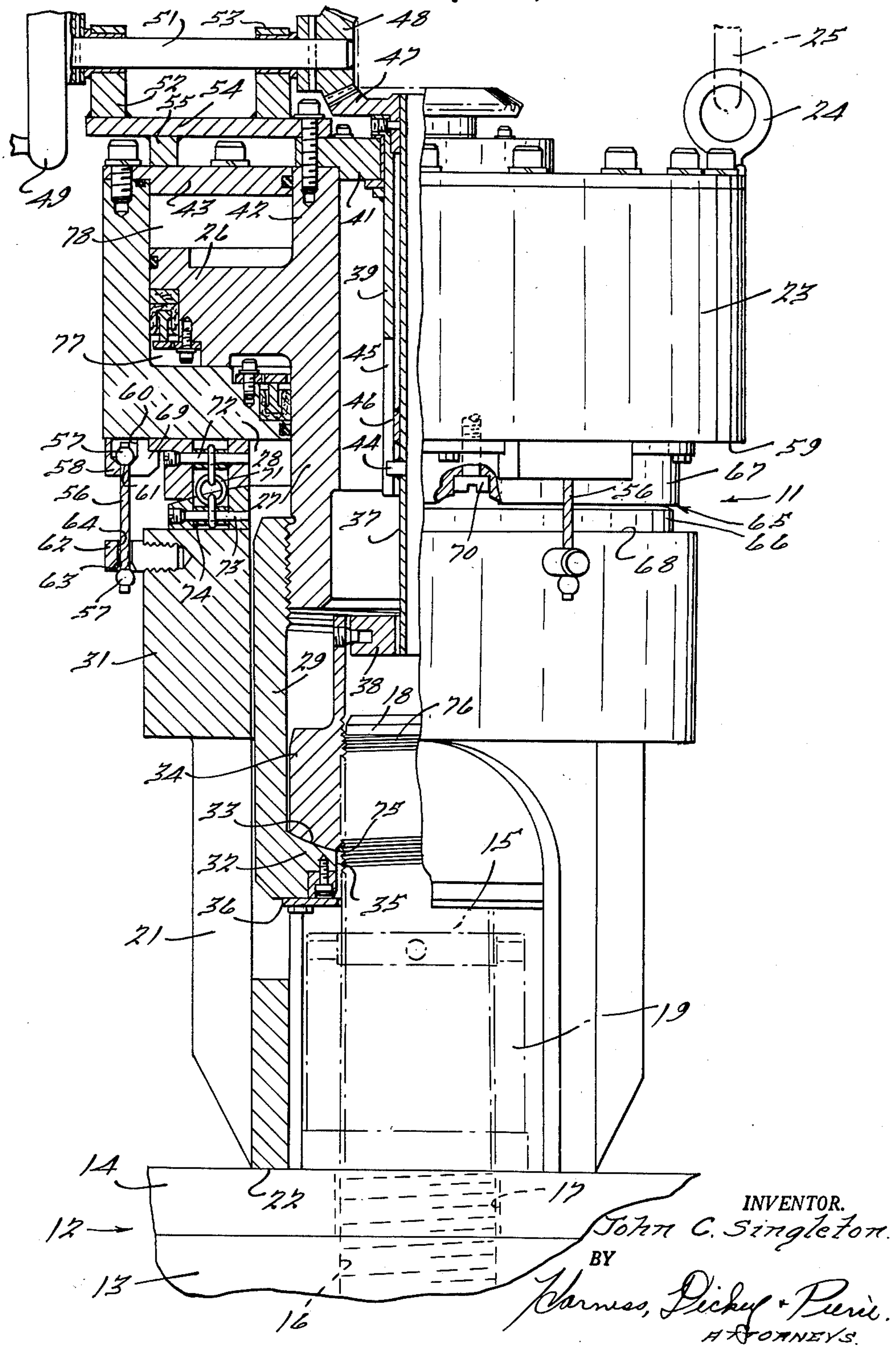
INVENTOR.
John C. Singleton
BY
Harness, Dickey & Pierce.
ATTORNEYS.

United States Patent Office 3,077,335

Patented Feb. 12, 1963

3,077,335
STUD TENSIONER

John C. Singleton, Lancaster, Ohio, assignor to Diamond Power Specialty Corporation, Lancaster, Ohio, a corporation of Ohio Filed Apr. 14, 1961, Ser. No. 103,017
11 Claims. (Cl. 254—29)

This invention relates to stud tensioners, and more particularly to devices for applying tension to large studs in order that the nuts threaded thereon may be tightened or loosened. This application is a continuation-in-part of application Serial No. 45,645, filed July 27, 1960 by John C. Singleton and LeRoy S. DeMart, entitled, Adaptor, and assigned to the assignee of the present application.

It is an object of the invention to provide a novel and improved stud tensioner construction which insures proper alignment of all portions of the stud tensioner after being mounted on each stud without difficulty due to variations in the position of the pedestal with respect to the stud or in stud angularity.

Other objects, features and advantages of the present invention will become apparent from the subsequent description, taken in conjunction with the accompanying drawings.

In the drawing:

The FIGURE is a side elevational view, partly in cross section, of a stud tensioner embodying the present invention, the tensioner being shown as mounted on a vessel and engaged with the stud.

In general terms, the illustrated embodiment of the invention comprises a pair of spherical bearing elements mounted between the pedestal and cylinder portions of a stud tensioner, together with means in the form of link chains for loosely connecting these bearing elements. The upper bearing element is secured to the undersurface of the cylinder, while the lower element is adapted to removably rest on a flat surface at the upper end of the pedestal.

The cylinder and pedestal are also connected by a plurality of flexible links, the length of these links being somewhat greater than the distance between their supports when the upper bearing element rests on the lower element and the latter rests on the pedestal. In this manner, lifting of the unit by a crane connected to the upper end of the cylinder will cause separation of the lower bearing element from the pedestal, so that when the drawbar is mounted on the stud the bearing elements may shift with respect to the pedestal. When the cylinder is again lowered, the bearing elements will be centered with respect to each other, thus assuring proper bearing action to compensate for angularity in the stud.

Referring more particularly to the drawings, the stud tensioner is generally indicated at 11 and is adapted to be mounted on a vessel or other assembly generally indicated at 12. This vessel has a body 13 and a cover 14, together with a plurality of circumferentially spaced studs 15 threaded in apertures 16 around the upper rim of body 13 and projecting through apertures 17 in cover 14. The main portion of the stud is threaded, but the upper end has a short unthreaded guide portion 18 for receiving the drawbar as later described.

A nut 19 is threadably mounted on each stud, and one purpose of the stud tensioner is to tension and thereby elongate the stud so that nut 19 may be tightened by hand or with light wrench pressure. By equalizing the tension on all the studs 15 before their respective nuts are tightened, accurate equalization of stud force may be achieved.

Stud tensioner 11 comprises a pedestal 21 having a plurality of spaced legs adapted to be lowered around each stud and nut, the lower ends 22 of these legs resting on cover 14. A cylinder 23 is disposed above pedestal 21 and has a plurality of spaced eyes 24 mounted at its upper end so that the entire unit 11 may be lifted and transported by a trolley or crane, one hook of which is shown partially in dot-dash lines at 25.

A piston 26 is mounted within cylinder 23 and carries a lower extension 27 projecting downwardly through the lower wall 28 of cylinder 23. A drawbar 29 is threaded on the lower end of piston extension 27 and extends downwardly through the upper hollow portion 31 of pedestal 21. Drawbar 29 is of annular shape and has an inward extension 32 at its lower end, the upper surface 33 of portion 32 being slightly concave and sloping inwardly and downwardly. A self-aligning connector 34 is disposed within drawbar 29 and is supported by surface 33. Connector 34 is internally threaded so as to be threadable onto stud 15, portion 32 of drawbar 29 having a clearance aperture 35 which permits it to pass over the stud when the drawbar is lowered. An annular guard plate 36 of soft metal, such as aluminum, is secured to the underside of drawbar portion 32 so as to prevent damage to the stud threads.

Connector 34 is supported by a connector actuating tube 37 through a gimbal shown partially at 38, so that universal rocking movement of connector 34 with respect to tube 37 is permitted. Tube 37 is slidable within a guide 39 of tubular shape rotatably mounted in a plate 41 secured to an upward extension 42 on piston 26, extension 42 passing through a cover plate 43 on the cylinder. Tube 37 carries a pin 44 slidable within a vertical slot 45 in the lower end of guide 39 and also carries pads 46 to facilitate sliding movement within guide 39.

A bevel gear 47 is secured to the upper end of guide 39, the upper end of tube 37 passing through the hub of this gear. A bevel pinion 48 meshes with gear 47, and a hand wheel 49 is connected to pinion 48 by a shaft 51. Shaft 51 is supported by a pair of bearings 52 and 53, these bearings being mounted on a supporting plate 54 secured to and extending outwardly from plate 41. A spacer 55 secured to the underside of plate 54 is engageable with cover plate 43 when the piston is in its lower position as shown in the figure.

A plurality of circumferentially spaced flexible links 56 are provided between cylinders 23 and pedestal 31, these links being fabricated from material such as steel cable. The upper and lower ends of each link 56 carry enlarged portions 57. Retaining brackets 58 are secured to the undersurface 59 of cylinder 23, these brackets having cavities 60 in their upper ends for receiving portions 57 and clearance apertures 61 for links 56. Additional retaining brackets 62 are mounted on pedestal portion 31 and have enlarged cavities 63 at their lower ends to receive enlargements 57, together with clearance apertures 64 for links 56. Brackets 62 extend radially outwardly from pedestal portion 31 so that transverse or radial shifting of the pedestal with respect to the cylinder will be permitted, without any portions of the unit interfering with the consequent flexing of links 56.

A spherical bearing generally indicated at 65 is provided between pedestal 21 and cylinder 23, this bearing comprising a lower element 66 and an upper element 67. Both elements are of annular shape so as to accommodate drawbar 29, and lower element 66 has a flat undersurface engageable with the flat annular top 68 of pedestal portion 31. The upper surface of bearing element 66 is of slightly convex shape, the center of curvature of this surface being located a substantial distance below element 66.

Upper element 67 has a flat upper surface engageable with the undersurface 59 of cylinder 23. Element 67 is rigidly secured to cylinder 23 by means of inward extensions 69 on brackets 58 or by other means such as threaded fasteners 70 mounted in counterbored apertures extending upwardly from the bearing element undersurface. The surface of bearing element 67 facing element 66 is of concave shape to match the upper surface of bearing element 66, so that when the upper element rests on the lower element, cylinder 23 and its associated parts may rock about an axis passing through the center of curvature of the matching surfaces.

A plurality of link chains 71 are disposed within aligned apertured portions of the upper and lower bearing elements in circumferentially spaced relation, and serve to loosely connect these elements. Three links are shown in each chain 71, the upper link being supported by a pin 72 in bearing element 67 and the lower link by a pin 73 in lower element 66. Sleeves 74 on pins 72 and 73 serve to maintain the chains in centered position. The looseness in chain 71 is such that when cylinder 23 is lifted by crane hooks 25, the lower surface of element 67 will leave the upper surface of element 66 before chains 71 begin to lift element 66 away from upper pedestal surface 68. However, the chains are short enough so that element 66 will leave surface 68 before flexible links 56 begin to lift pedestal 21, with just enough slack to permit element 67 to rock on element 66.

In operation, assuming an initial condition in which crane hooks 25 are supporting unit 11 above a stud 15 and it is desired to tension the stud, unit 11 will be lowered by the crane so that pedestal 21 will surround the stud and the nut. While the unit is being lowered, pedestal 21 will be supported by links 56, so that bearing 65 will be separated from pedestal surface 68, the lower bearing element 66 being supported by link chains 71 which maintain it centered with respect to upper bearing element 67. As the unit is lowered, the lower end 32 of drawbar 29 will be centered with respect to the stud so as to move downwardly over upper stud end 18 and the threaded portion of stud 15.

During this portion of the movement, that is, as drawbar 29 passes over the upper end of stud 15, pedestal 21 will not yet have engaged top 14 of vessel 12. Connector 34 will also pass over unthreaded stud end 18, but when the lower end 75 of the internal connector thread engages the upper end 76 of the stud thread, further downward movement of drawbar 29 will not be accompanied by downward movement of connector 34. Pin 44 will slide upwardly with respect to slot 45 and tube 37 will appear as it projects upwardly through gear 47 during this portion of the movement.

When pedestal 21 engages top 14, the pedestal will tend to adjust itself in accordance with the contacting surface contours, and the lower enlarged ends 57 of links 56 will move away from their bracket cavities 63. At this point bearing 66 will not yet have engaged upper pedestal surface 68, so that this surface will be permitted to adjust itself with respect to bearing 65 in accordance with the positioning of the pedestal before bearing 65 drops onto surface 68.

Further downward movement of the unit by crane hooks 25 will cause lower bearing element 66 to engage surface 68. If this surface has some angularity with respect to the undersurface 59 of cylinder 23, due to the final positioning of the pedestal, such angularity will be compensated for by relative shifting of bearing elements 66 and 67 on their mating surfaces. Links chains 71 will, of course, be loose enough to permit such shifting. After cylinder 23 is fully supported by pedestal 21, hand wheel 49 may be rotated to cause rotation of guide 39, tube 37 and connector 34, thus threading the connector onto the stud until the undersurface of the connector engages drawbar surface 33. Any required angular shifting of the connector will be accommodated by gimbal 38 and the curvature of surface 33.

Pressure applied to lower chamber 77 of cylinder 23 will then cause an upward force to be exerted on drawbar 29 and thus on connector 34, causing stud 15 to become elongated. Any slight angular shifting between the cylinder and pedestal due to this increased pressure will, of course, be accommodated by spherical bearing 65. When sufficient force is being exerted on stud 15, nut 19 will be tightened by hand or by slight wrench pressure. The pressure in cylinder chamber 77 may then be relieved, and pressure applied to upper chamber 78 to cause piston 26 to be lowered. Hand wheel 49 may then be operated to release connector 34 from stud 15.

The operation of the spherical bearings, flexible links and associated parts will be the same when the stud tensioner is being mounted on a stud in order to remove nut 19 therefrom. The invention obviates any problem with respect to alignment or matching of the contacting spherical bearing surfaces, and will permit unhampered positioning of the pedestal without detracting from the ability of the operator to quickly and properly connect the drawbar to the stud.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a stud tensioner, a pedestal, a piston and cylinder motor mounted above the pedestal and connectible to a stud, a flexible connection between the motor and pedestal permitting relative shifting movement therebetween, a spherical bearing having upper and lower elements disposed between said motor and pedestal, one of said elements being connected to and movable with said motor, the other element being movable with and connected to said pedestal, and a flexible connection between the upper and lower elements of the spherical bearing permitting relative rocking movement therebetween but limiting their separating movement in an axial direction.

2. The combination according to claim 1, further provided with a flat surface at the upper end of said pedestal wider than and supporting said lower spherical bearing element.

3. The combination according to claim 1, said flexible connection between the bearing elements comprising at least one link chain, and aligned apertured portions in said bearing elements within which said chain is disposed.

4. The combination according to claim 3, further provided with pins in said bearing elements securing the chain ends thereto, and sleeves on said pins for maintaining said chains centered on said pins.

5. The combination according to claim 1, further provided with means fastening said upper spherical bearing element to the underside of said motor.

6. In a stud tensioner, a pedestal, a piston and cylinder motor disposed above said pedestal, a drawbar connected to said motor and extending downwardly therefrom, means at the lower end of said drawbar for threadably connecting the drawbar to a stud, a flexible connection between said motor and pedestal comprising a plurality of circumferentially spaced flexible links, said links being of sufficient length to permit separating movement of the cylinder and pedestal for a predetermined distance, a spherical bearing comprising an upper element fixed to the underside of said motor, a matching lower spherical bearing element, a flexible connection between said upper and lower elements permitting relative rocking movement therebetween but permitting separating movement of the lower element from the upper element for substantially less than said predetermined distance, a flat upper surface on said pedestal, and a flat undersurface on said lower bearing element removably engageable with said pedestal surface in a variety of positions.

7. The combination according to claim 6, said flexible connecting means between the bearing elements comprising a plurality of circumferentially spaced link chains, and pins in said upper and lower elements connecting the chains thereto.

8. The combination according to claim 7, said bearing elements being provided with aligned apertured portions for accommodating said link chains, and sleeves on said pins maintaining said chains centrally located with respect to said apertured portions.

9. In combination with a stud tensioner of the type having a pedestal, a piston and cylinder motor disposed above said pedestal, and a spherical bearing between said pedestal and motor, said spherical bearing having an upper element connected to and movable with said motor and a lower element connected to and movable with said pedestal, the improvement comprising a flexible connection between said motor and pedestal permitting shifting movement of the motor with respect to the pedestal, and a second flexible connection between the upper and lower bearing elements permitting rocking movement between said elements and limiting axial separating motion theerof.

10. In combination with a stud tensioner of the type having a pedestal, a cylinder disposed above said pedestal, a flexible connection between said cylinder and pedestal permitting separating movement between the cylinder and pedestal for a predetermined distance, and a spherical bearing between the cylinder and pedestal, said spherical bearing having an upper element connected to and movable with said motor and a lower element connected to and movable with said pedestal, the improvement comprising a plurality of circumferentially spaced flexible connecting elements between the upper and lower bearing elements, said last-mentioned flexible connecting elements permitting relative rocking movement between the bearing elements but permitting separating movement of the bearing elements for only substantially less than said predetermined distance.

11. The combination according to claim 10, each of said connecting elements comprising a link chain, aligned apertured portions in said bearing elements for receiving said chain, pins passing through said bearing elements for connecting the chain ends thereto, and sleeves on said pins for centrally locating the chains in said apertured portions.

References Cited in the file of this patent

UNITED STATES PATENTS

| | | |
|---|---|---|
| 2,303,312 | Sheffield | Nov. 24, 1942 |
| 2,885,919 | Carlson | May 12, 1959 |